US008173030B2

(12) United States Patent
Lebens et al.

(10) Patent No.: US 8,173,030 B2

(45) Date of Patent: May 8, 2012

(54) LIQUID DROP EJECTOR HAVING SELF-ALIGNED HOLE

(75) Inventors: John Andrew Lebens, Rush, NY (US); Weibin Zhang, Pittsford, NY (US); Christopher Newell Delametter, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 827 days.

(21) Appl. No.: 12/241,747

(22) Filed: Sep. 30, 2008

(65) Prior Publication Data

US 2010/0078407 A1 Apr. 1, 2010

(51) Int. Cl.
*G01D 15/00* (2006.01)

(52) U.S. Cl. ............... 216/27; 216/79; 216/80; 438/753

(58) Field of Classification Search .................... 216/27, 216/79, 80, 83, 88, 89; 438/719, 753
See application file for complete search history.

(56) References Cited

U.S. PATENT DOCUMENTS

| | | | | |
|---|---|---|---|---|
| 3,747,120 | A | 7/1973 | Stemme | 346/75 |
| 3,946,398 | A | 3/1976 | Kyser et al. | 346/1 |
| 4,296,421 | A | 10/1981 | Hara et al. | 346/140 R |
| 2004/0036751 | A1 * | 2/2004 | Giere et al. | 347/93 |
| 2004/0104198 | A1 * | 6/2004 | Chen et al. | 216/27 |
| 2006/0044352 | A1 | 3/2006 | Bresciani et al. | |
| 2007/0188551 | A1 * | 8/2007 | Chen et al. | 347/45 |
| 2008/0020573 | A1 * | 1/2008 | Birkmeyer et al. | 438/689 |
| 2008/0136867 | A1 | 6/2008 | Lebens et al. | 347/47 |
| 2008/0180485 | A1 | 7/2008 | Delametter et al. | 347/47 |

FOREIGN PATENT DOCUMENTS

| | | | |
|---|---|---|---|
| JP | 10 044438 | A | 2/1998 |
| WO | WO 02/05946 | A1 | 1/2002 |

OTHER PUBLICATIONS

U.S. Appl. No. 12/143,880, filed Jun. 23, 2008, Lebens et al.

* cited by examiner

*Primary Examiner* — Lan Vinh
(74) *Attorney, Agent, or Firm* — Eugene I. Shkurko

(57) ABSTRACT

A method for forming a self-aligned hole through a substrate to form a fluid feed passage is provided by initially forming an insulating layer on a first side of a substrate having two opposing sides; and forming a feature on the insulating layer. Next, etch an opening through the insulating layer, such that the opening is physically aligned with the feature on the insulating layer; and coat the feature with a layer of protective material. Patterning the layer of protective material will expose the opening through the insulating layer. Dry etching from the first side of the substrate forms a blind feed hole in the substrate corresponding to the location of the opening in the insulating layer, the blind feed hole including a bottom. Subsequently, grind a second side of the substrate and blanket etch it to form a hole through the entire substrate.

17 Claims, 14 Drawing Sheets

SECTION B-B

SECTION B-B

SECTION B-B

SECTION B-B

LIQUID DROP EJECTOR HAVING SELF-ALIGNED HOLE

FIELD OF THE INVENTION

The present invention relates generally to the formation of a fluid feed and, more particularly, to ink feeds used in ink jet devices and other liquid drop ejectors.

BACKGROUND OF THE INVENTION

Drop-On-Demand (DOD) liquid emission devices have been known as ink printing devices in ink jet printing systems for many years. Early devices were based on piezoelectric actuators such as are disclosed by Kyser et al., in U.S. Pat. No. 3,946,398 and by Stemme in U.S. Pat. No. 3,747,120. A currently popular form of ink jet printing, thermal ink jet (or "thermal bubble jet"), uses electrically resistive heaters to generate vapor bubbles which cause drop emission, as is discussed by Hara et al., in U.S. Pat. No. 4,296,421. Although the majority of the market for drop ejection devices is for the printing of inks, other markets are emerging such as ejection of polymers, conductive inks, or drug delivery.

The printhead used for drop ejection in a thermal inkjet system includes a nozzle plate having an array of ink jet nozzles above ink chambers. At the bottom of an ink chamber, opposite the corresponding nozzle, is an electrically resistive heater. The ink chamber, nozzle plate, and heater are formed on a substrate, typically made of silicon, which also contains circuitry to drive the electrically resistive heaters. In response to an electrical pulse of sufficient energy, the heater causes vaporization of the ink, generating a bubble that rapidly expands and ejects an ink drop from the ink chamber. Ink is replenished to the ink chamber through ink feed channels, located adjacent the ink chamber, typically formed through the silicon substrate on which the ink chambers are formed.

The ink feed channels of the prior art have been formed in various ways using laser drilling, wet etching, or dry etching of the silicon. Printheads are typically fabricated using silicon wafers. The ink feed channels of the prior art has a long slot formed by patterning and etching through the silicon wafer from the back or non-device side. Most printheads of the prior art, use a single long slot for each color of ink. Multiple long slots are therefore formed in a thick silicon substrate, one for each color.

There is a desire to increase the number of nozzles on a printhead for each color. It is also desirable to decrease the spacing between ink feed channels to shrink the size of the printhead for lower cost. Increasing the number of nozzles increases the length of the printhead and therefore the length of the ink feed channels. This long channel in the silicon substrate will weaken the printhead making it more susceptible to stress cracking. Co-pending application (U.S. Publication No. 2008/0136867 A1), discloses the use of anisotropic dry silicon etch, utilizing the "Bosch" process (also known as pulsed or time-multiplexed etching), in which ribs are formed to break up the ink feed channel into sections to increase the strength of the printhead making it more extensible.

However, there is also a desire to increase the frequency of drop ejection. One limitation on the frequency of drop ejection is the time required to refill the ink chamber after the previous drop ejection. The frequency of drop ejection can be increased, if the time required to refill the ink chamber is decreased. Co-pending application (U.S. Publication No. 2008/0180485 A1), discloses a dual feed printhead in which the ink feed channel is replaced by multiple ink feed holes for each ink color, with the ink feed holes located on both sides of the ink chamber. In this case, long ink feed channels on both sides of the ink chamber cannot be utilized, as they would result in a considerable decreased strength for the structure.

In the dual feed printhead, therefore, the preferred ink feed openings are much smaller than the ink feed channels of the prior art, with lengths extending across 1-2 nozzles corresponding to a length of 20-100 μm and similar width. The use of these multiple feed holes, provide strength and extensibility to the printhead. However these small openings cause fabrication issues. Such small feature sizes cannot be formed using wet etching or laser etching. Instead, a dry anisotropic etch process utilizing the "Bosch" process must be used. For dry etching of small openings with high aspect ratio the etch rate is much slower than for large slots, and slows down further the deeper the etch proceeds, therefore increasing the etch time for formation of these holes. The silicon substrate can be thinned prior to etching to decrease this etch time. It is also desirable to thin the substrate to reduce viscous drag of ink through these small holes, so that ink refill time can be decreased. In fact, silicon substrate thicknesses less than 200 μm are desired to minimize the effect of viscous drag on the ink refill time, and to provide a good aspect ratio for high etch processing throughput during fabrication. However, processing of such thin wafers to pattern and etch the ink feed holes through the back of the wafer is difficult, resulting in wafer breakage and yield loss. It is, therefore, desirable to form ink feed holes along with minimizing the process steps on thin wafers.

Another method to decrease the viscous drag is by varying the ink feed opening versus the depth of the feed hole. In the prior art wet etching has been used to provide an anisotropic etch where the feed channel opening is wider at the back of the substrate and narrows down to a smaller opening at the front of the substrate next to the ink chamber. However, the sidewall angle for this, wet etch process of 54.74° is large, and for closely spaced ink feed channels, wet etching is not possible. The anisotropic dry silicon etch, utilizing the "Bosch" process produces openings that typically remain the same width or are reentrant in profile through the substrate in the opposite direction that is desired. It is, therefore, desirable to have a process where the ink feed opening is narrower at the front of the substrate adjacent the ink chamber and wider at the back of the substrate, but where the sidewall angle is significantly less than 54.74°.

In the dual feed printhead, to minimize the ink refill time, the ink openings are located very close to the ink chamber. Alignment of the ink feed openings to the ink chamber is critical. In prior art, the patterning of the ink feed channels is performed using back to front wafer alignment of a mask. However, there are issues in fabrication that degrade alignment. If the silicon wafer is warped the ink feed channels will not align precisely with the mask. Also, during the etch process itself, the etch direction is not completely perpendicular to the wafer surface, especially approaching the wafer edge, due to directional variation of the ions. It is also difficult to time the etch process so that there is no over etching causing undercut of the silicon wafer at the device side. It is desirable to have a process that self-aligns the ink feed channel to the ink chamber.

In forming the ink feed holes through the wafer from the back, the etching of the silicon stops on material used to form the ink chamber. The timing of the endpoint is critical as over etching causes undercut of the ink feed opening at the front surface that causes misalignment of the ink feed opening. Under etching of the area for the ink feed opening could yield a partially formed ink feed opening or even an entirely closed ink feed opening, which is undesirable. Since the etch rate is not uniform across the wafer there will always be ink feed openings that will be overetched. It is desirable to have a process that self aligns the ink feed opening to the ink chamber resulting in uniform ink feed openings with no undercut.

There is, therefore, a need for a printhead that has small ink feed holes aligned to the ink feed chambers that are easily fabricated with high yield. This printhead should also be capable of ejecting drops at high frequencies with an ink chamber refill capability to meet this ejection frequency requirement.

SUMMARY OF THE INVENTION

A method for forming a self-aligned hole through a substrate to form a fluid feed passage is provided by initially forming an insulating layer on a first side of a substrate having two opposing sides; and forming a feature on the insulating layer. Next, etch an opening through the insulating layer, such that the opening is physically aligned with the feature on the insulating layer; and coat the feature with a layer of protective material. Patterning the layer of protective material will expose the opening through the insulating layer. Dry etching from the first side of the substrate forms a blind hole in the substrate corresponding to the location of the opening in the insulating layer, the blind hole including a bottom. Subsequently, grind a second side of the substrate and blanket etch it to form a hole through the entire substrate.

Another embodiment of the present invention provides a method for forming a plurality of liquid ejection devices, the method including the steps of:

forming an insulating layer on a first side of a silicon wafer having two opposing sides;

forming an array of drop forming mechanisms on the insulating layer on the silicon wafer;

etching a plurality of openings through the insulating layer on the silicon wafer;

forming a chamber layer on the insulating layer on the silicon wafer, the chamber layer including walls between each drop forming mechanism;

coating the chamber layer with a layer of photoresist;

patterning the layer of photoresist to expose the openings through the insulating layer;

dry etching from the first side of the silicon wafer to form blind holes in the silicon wafer corresponding to the locations of the openings in the insulating layer, the blind holes including bottoms;

forming a nozzle layer on the chamber layer;

patterning the nozzle layer to provide an array of nozzles corresponding to the array of drop forming mechanisms;

grinding a second side of the silicon wafer to within a distance of 50 microns from the bottoms of the blind holes; and blanket etching the second side of the silicon wafer to open the blind holes to form a plurality of holes through the entire silicon wafer.

A third embodiment of the present invention provides a printhead that includes a silicon wafer having a first side including a row of chambers and a second side, including a ground surface. Also included are a plurality of self-aligned holes disposed along a first side of the row of chambers and a plurality of self-aligned holes disposed along a second side of the row of chambers, and extending from the first side of the silicon wafer to the second side. Each self-aligned hole is smaller at the first side of the silicon wafer than at the second side of the silicon wafer to form a retrograde profile angle. A drop forming mechanism in the chamber; along with a nozzle plate proximate to the drop forming mechanism; and a source of fluid for supplying fluid to the hole is also included in the printhead.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
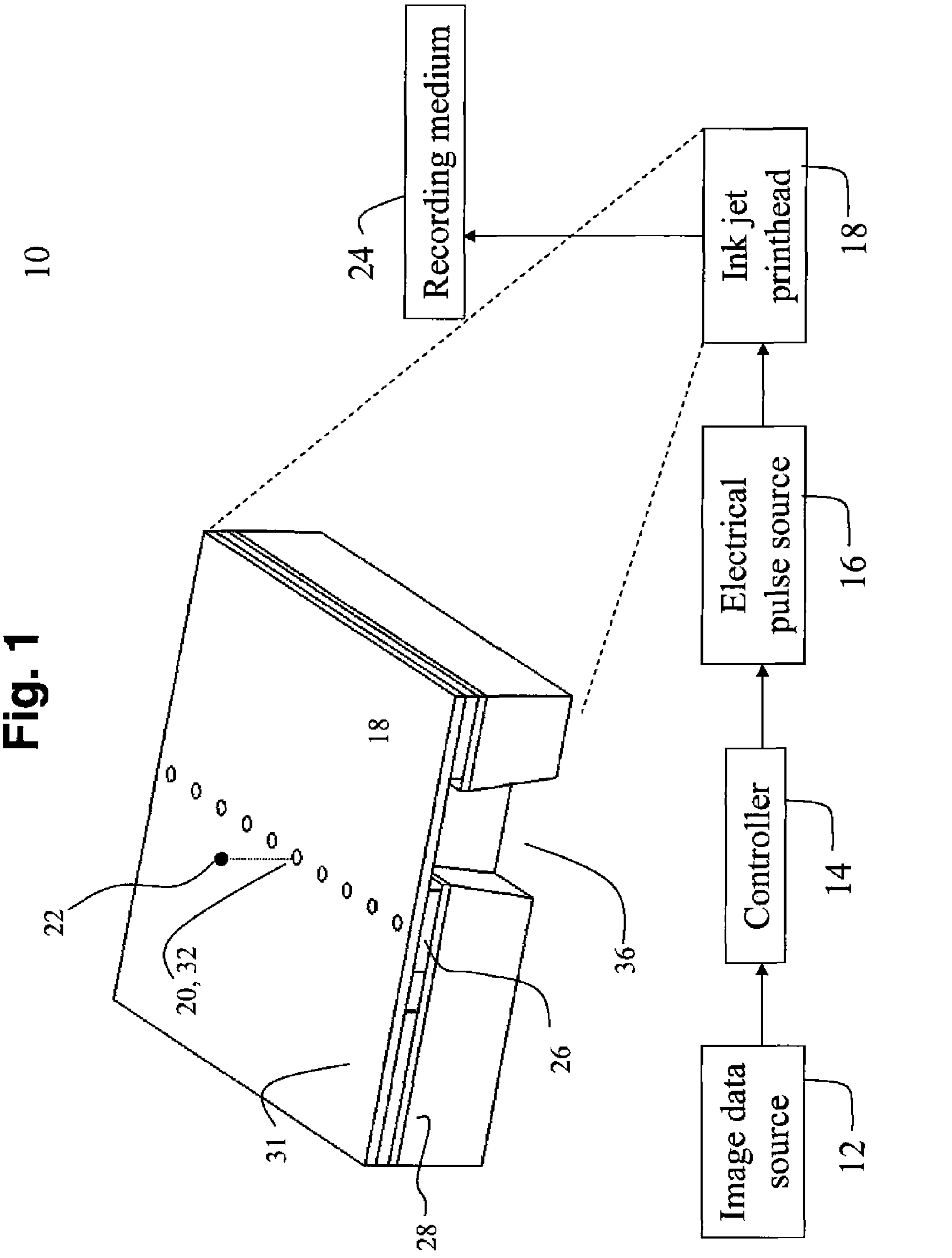
FIG. 1 is a schematic representation of a liquid ejection system incorporating the present invention.

The present description will be directed in particular to elements forming part of, or cooperating more directly with, apparatus in accordance with the present invention. It is to be understood that elements not specifically shown or described may take various forms well known to those skilled in the art. In the following description, identical reference numerals have been used, where possible, to designate identical elements.

As described in detail herein below, at least one embodiment of the present invention provides a method for forming an ink feed hole or passage for a liquid drop ejector. The most familiar of such devices are used as printheads in ink jet printing systems. Many other applications are emerging which make use of liquid feed holes in systems similar to ink jet printheads, which emit liquids other than inks, and that need a simple, self-aligned liquid feed hole formation. The terms ink jet and liquid drop ejector will be used herein interchangeably. The inventions described below provide methods for improved fluid feed formation, especially ink, for a liquid drop ejector.

Referring to FIG. 1, a schematic representation of a liquid ejection system 10, utilizing a printhead fabricated according to the present invention, is shown. Liquid ejection system 10 includes a source 12 of data (for example, image data), which provides signals that are interpreted by a controller 14 as being commands to eject liquid drops. Controller 14 outputs signals to a source 16 of electrical energy pulses that are sent to liquid ejector printhead die 18 (e.g., an inkjet printhead), a partial section of which is shown in the figure. Typically, a liquid ejector printhead die 18 includes a plurality of liquid ejectors 20 arranged in at least one array, for example, a substantially linear row. During operation, liquid or fluid, for example, ink in the form of ink drops 22, is deposited on a recording medium 24.

Figure 2:
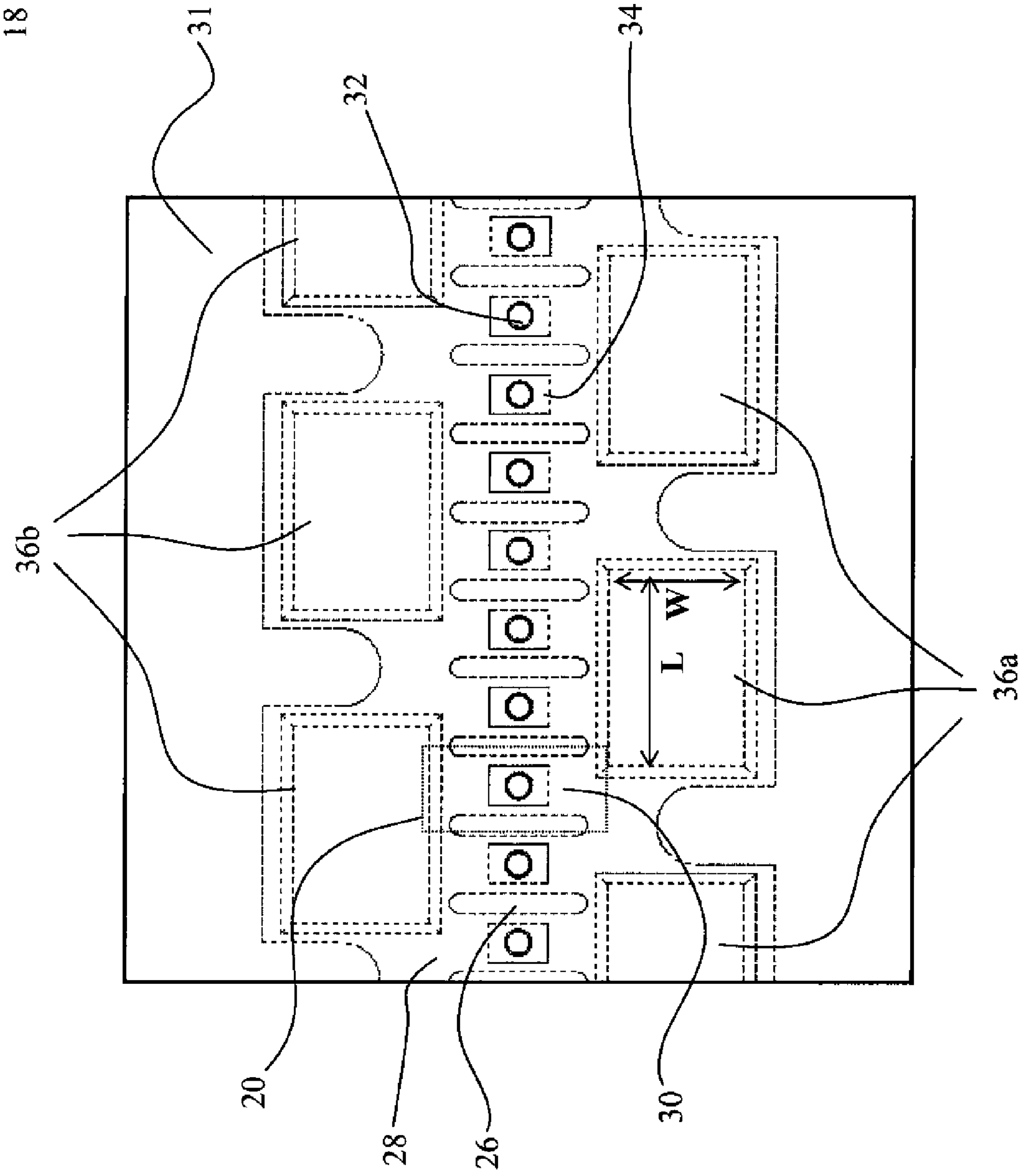
FIG. 2 is a schematic top view of a partial section of a liquid ejection printhead according to the present invention.
Figure 3:
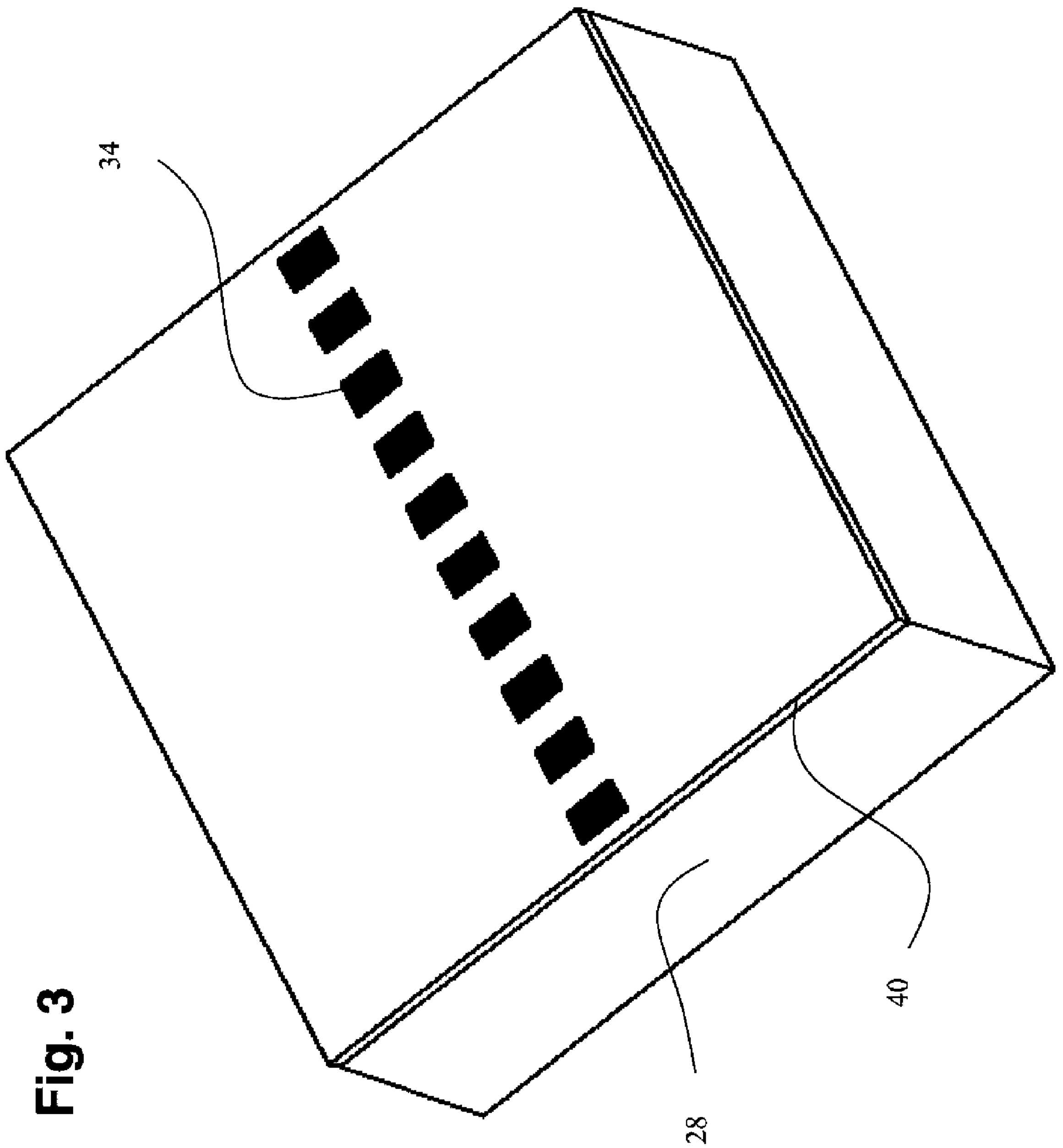
FIGS. 3-9 show one embodiment of a method for forming a liquid ejection printhead, shown schematically in FIG. 2, according to the present invention.

Referring to FIG. 2, a schematic representation of a top view of a partial section of a liquid ejector printhead die 18 for ink is shown. Liquid ejector printhead die 18 includes an array or plurality of liquid ejectors 20, one of which is designated by the dotted line in FIG. 2. Liquid ejector 20 includes a structure, for example, having walls 26 extending from a substrate 28 that define a chamber 30. Walls 26 separate liquid ejectors 20 positioned adjacent to other liquid ejectors 20. Each chamber 30 includes a nozzle orifice 32 in nozzle plate 31 through which liquid is ejected. A drop forming mechanism, for example, a resistive heater 34 is also located in each chamber 30. In FIG. 2, the resistive heater 34 is positioned above the top surface of substrate 28 in the bottom of chamber 30 and opposite nozzle orifice 32, although other configurations are permitted. In other words, in this embodiment the bottom surface of chamber 30 is above the top of substrate 28, and the top surface of the chamber 30 is the nozzle plate 31.

Referring to FIGS. 1 and 2, feed holes 36 consist of two linear arrays of feed holes **36*a* and 36*b* that supplies liquid to the chambers 30. Feed holes 36*a* and 36*b* are positioned on opposite sides of the liquid ejector 20 containing chamber 30 and nozzle orifice 32. In FIG. 2 the feed holes 36 are arranged so that feed holes 36*a* are located primarily adjacent a pair of liquid ejectors 20 and feed holes 36*b* are located primarily adjacent the next pair of chambers 30** in the printhead array. Other geometries are also possible as disclosed in co-pending application (U.S. Publication No. 2008/0180485A1), and incorporated herein by reference.

Referring to FIG. 2, liquid ejectors are formed in a linear array at a high nozzle per inch count. In one exemplary embodiment of the present invention the liquid ejectors 20 are spaced with a period of 20-42 μm. The length L of feed opening 42 can vary from 10 μm to 100 μm, depending on the design. The width W of the feed opening 42 can also vary similarly from 10 μm to 100 μm.

FIGS. 3-9 illustrate a fabrication method of an exemplary embodiment of the present invention for forming a liquid ejection printhead 18 containing multiple small feed holes 36 aligned to liquid ejectors 20, for high frequency operation. The fabrication method illustrated in FIGS. 3-9 is summarized in FIG. 12 that shows a flow chart of the step sequence for fabricating a liquid ejection printhead 18.

Figure 12:
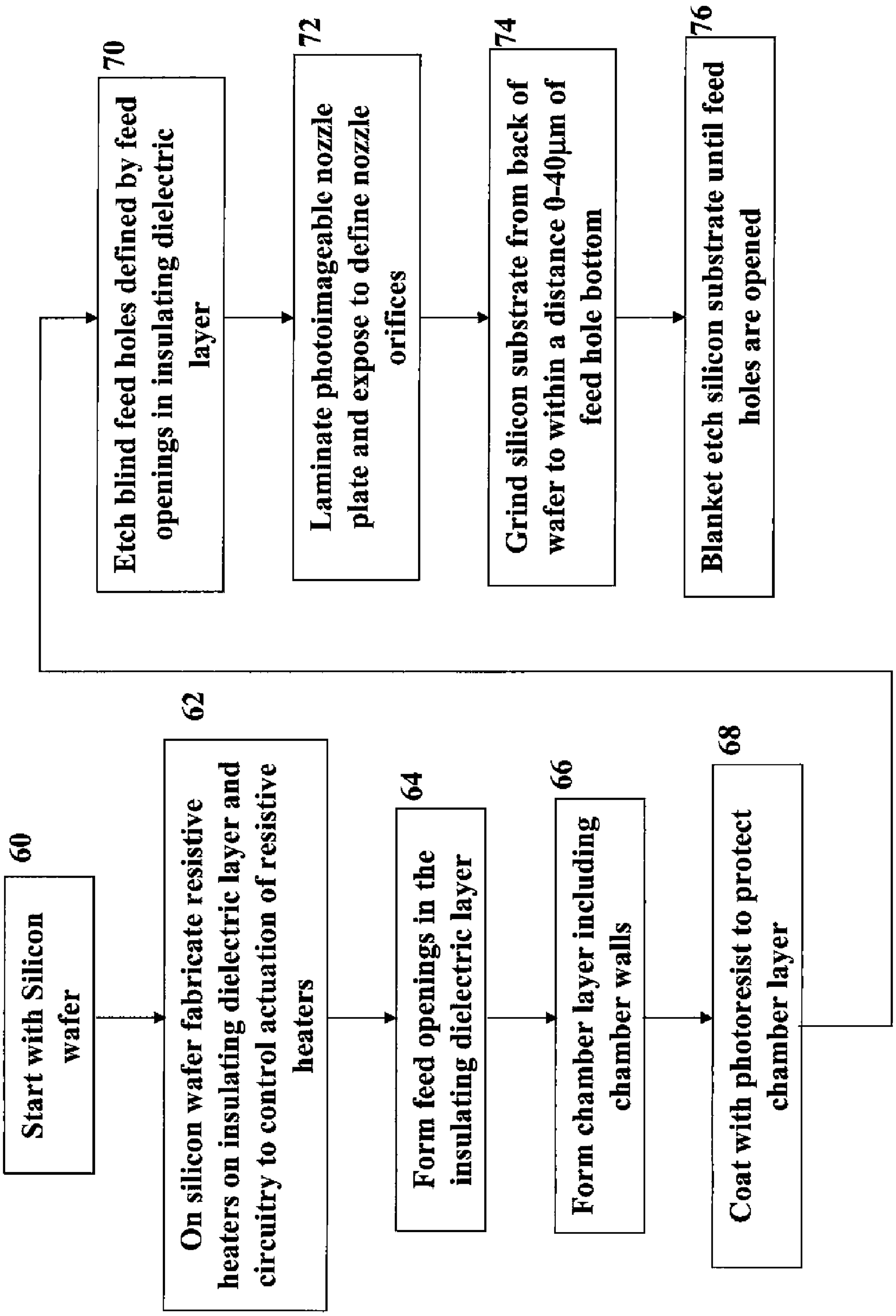
FIG. 12 is a flow chart describing the steps for fabricating a liquid ejection printhead as shown in FIGS. 3-9 according to the present invention.

Starting with a substrate 28, a silicon wafer as described in step 60 of the flow chart of FIG. 12 is used. As described in step 62 of FIG. 12 and shown as a partial section of a liquid ejection printhead die 18 in FIG. 3, a drop forming mechanism, in this case, an array of resistive heaters 34 are formed on top of an insulating dielectric layer 40, which is formed on top of the silicon substrate 28. Fabricated in the liquid ejection printhead 18, but not shown, are electrical connections to the resistive heaters 34, as well as power LDMOS and CMOS logic circuitry to control drop ejection. The insulating dielectric layer 40 may also be deposited during these processes. The fabrication of the heater structure is described in co-pending application (U.S. patent application Ser. No. 12/143,880), and incorporated herein by reference.

Figure 4:
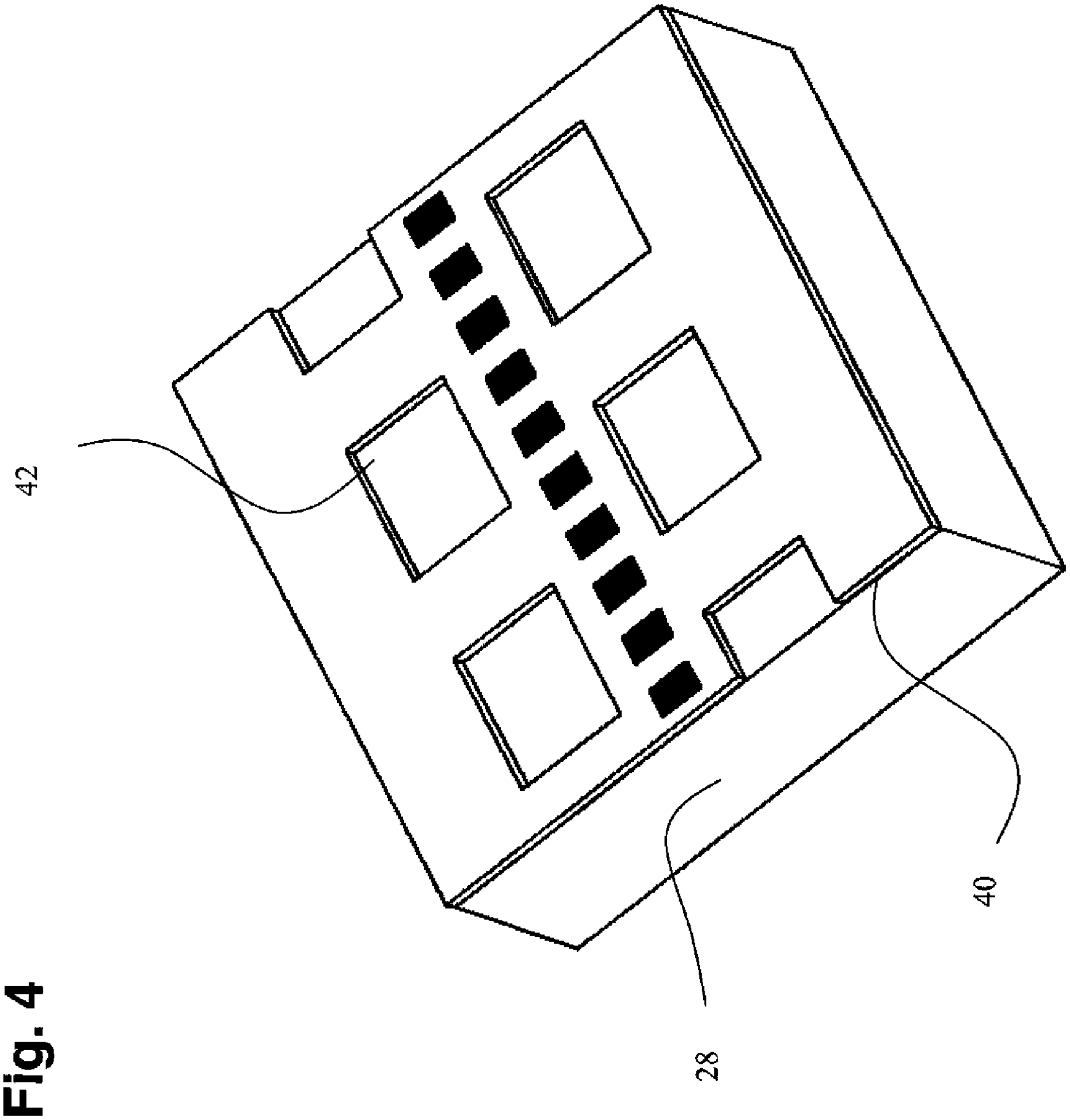

As described in step 64 of FIG. 12, FIG. 4 shows a partial section of a liquid ejection printhead die 18 after patterning and etching through the insulating dielectric layer 40 to the silicon substrate 28 forming feed openings 42.

Figure 5:
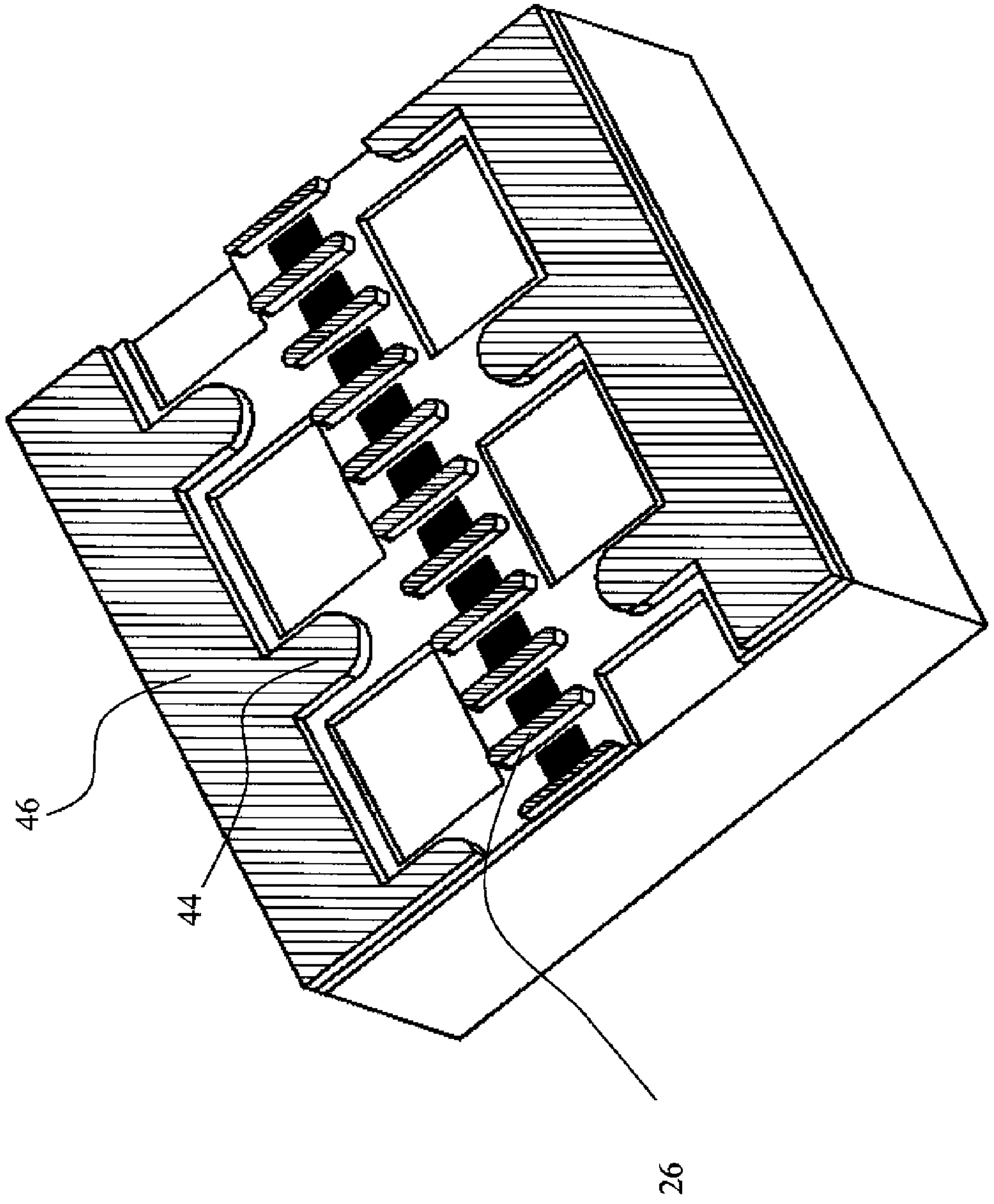

As described in step 66 of FIG. 12, FIG. 5 shows a partial section of a liquid ejection printhead die 18 after formation of the chamber layer 44 that includes walls 26 between each liquid ejector 20 and an outer passivation layer 46 that extends over the rest of the liquid ejection printhead die 18 to protect the circuitry from liquid or fluid, such as ink. The chamber layer 44 can be formed by spin coating, exposure, and development using a photoimageable epoxy such as a novolak resin based epoxy, for example: TMMR resist available from Tokyo Ohka Kogyo. The thickness of the chamber layer 44 is in the range 8-15 μm.

Figure 6A:
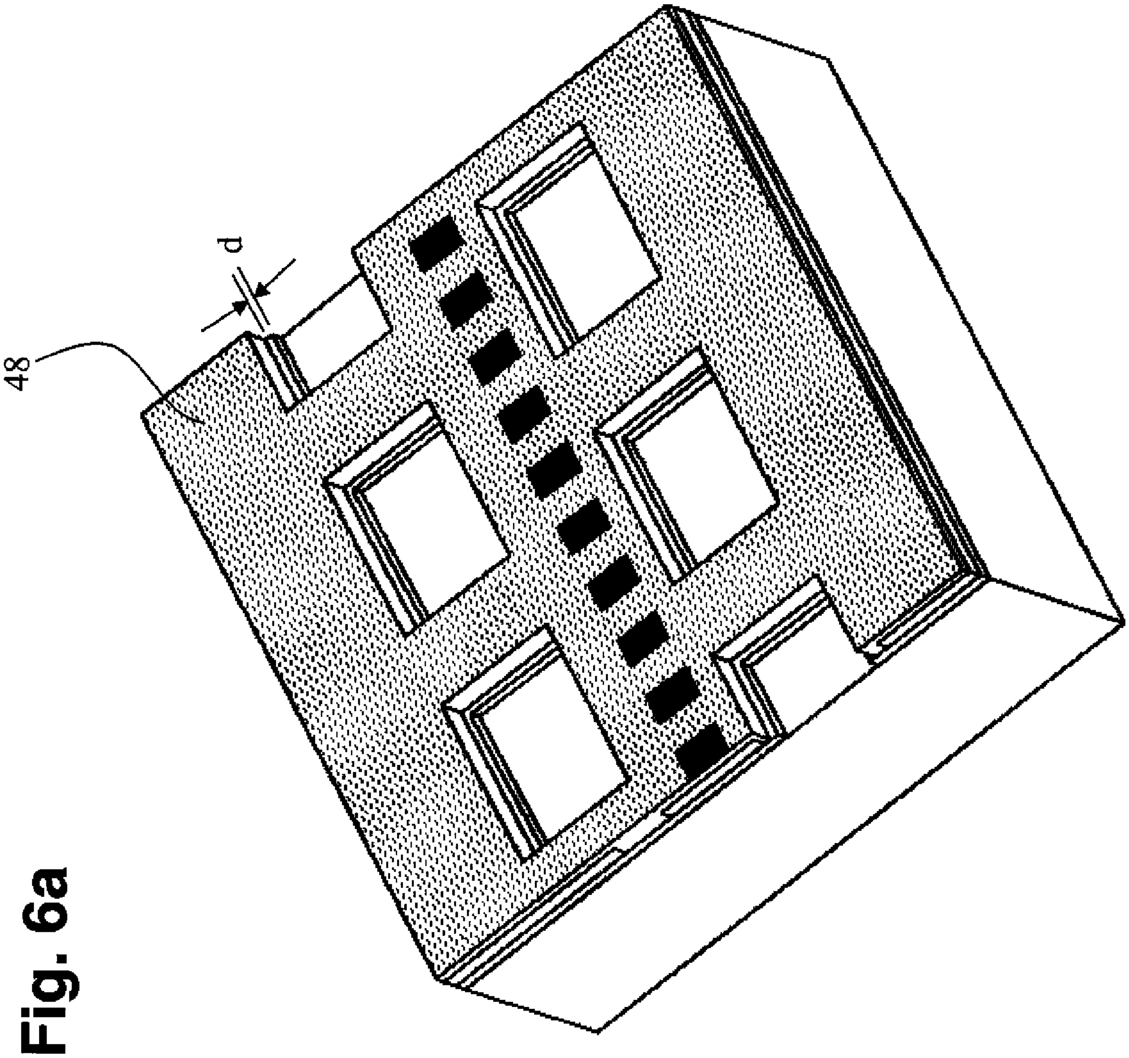
Figure 6C:
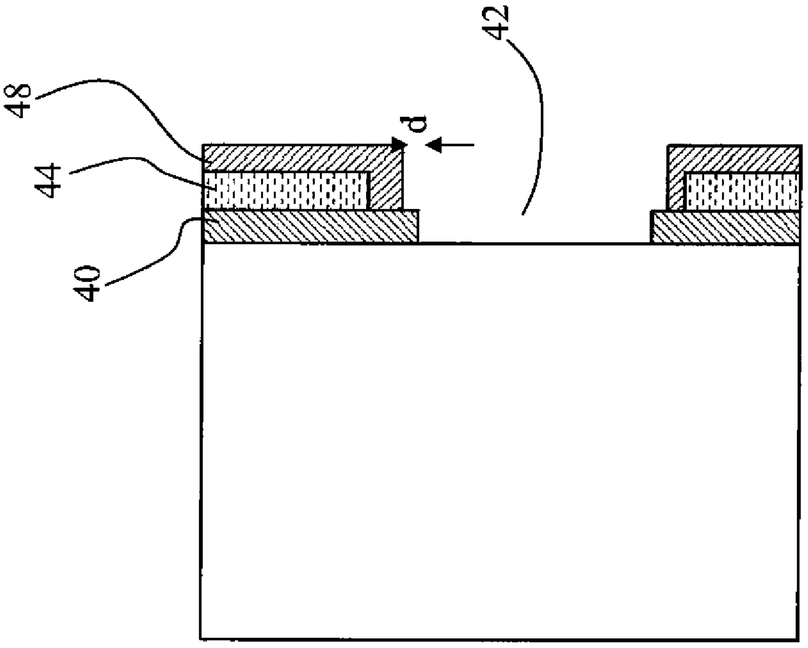
Figure 6B:
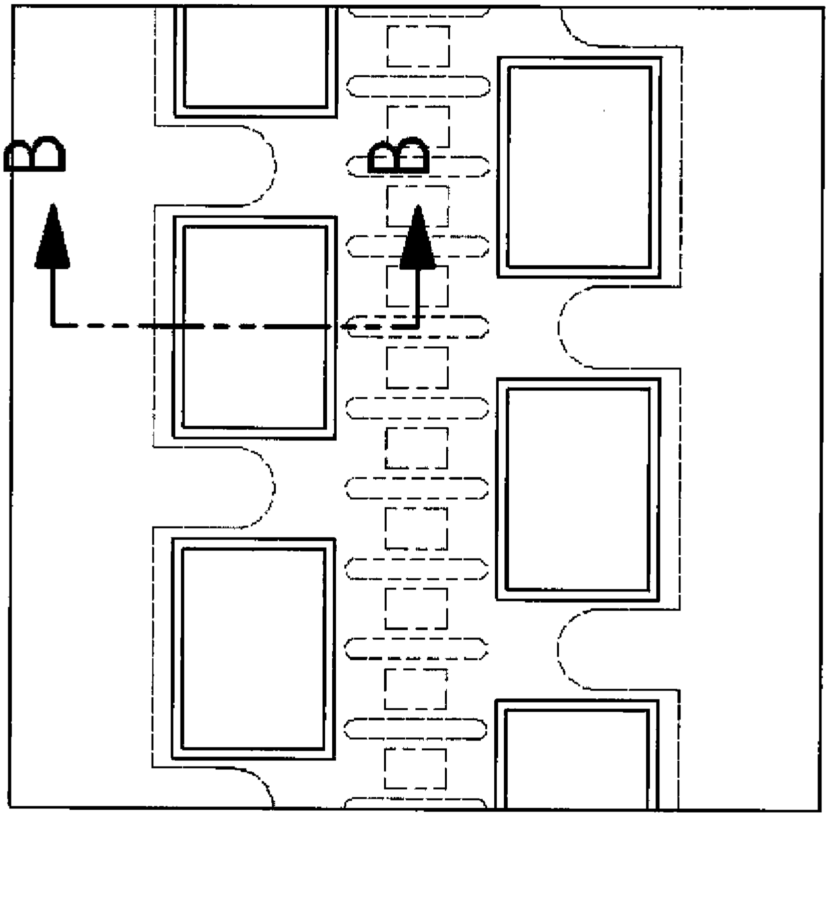

As described in step 68 of FIG. 12, FIG. **6*a* shows a partial section of a liquid ejection printhead die 18 after a layer of photoresist 48 has been coated and patterned. This photoresist layer 48 is patterned to protect the chamber layer 44 from being attacked during etching of the feed holes. The photoresist layer 44 is patterned so that it is pulled back a distance d from feed opening definition 42 patterned in the insulating dielectric layer 40. In one embodiment this distance d is 0-2 μm. FIG. 6*b* shows a top view of a partial section of a liquid ejection printhead die 18 after a layer of photoresist layer 48 has been coated and patterned. Section B-B, taken from FIG. 6*b*, is shown in FIG. 6*c* and illustrates the pull-back distance d of the patterned photoresist layer 48 from the feed opening definition 42 patterned in the insulating dielectric layer 40. The thickness of photoresist coated is dependent on the thickness of the chamber layer 44 and is designed to provide a thickness on top of the chamber layer 44** to protect it from being attacked during the etching of the feed openings as some thickness of the photoresist is lost during the etch process.

Figure 7B:
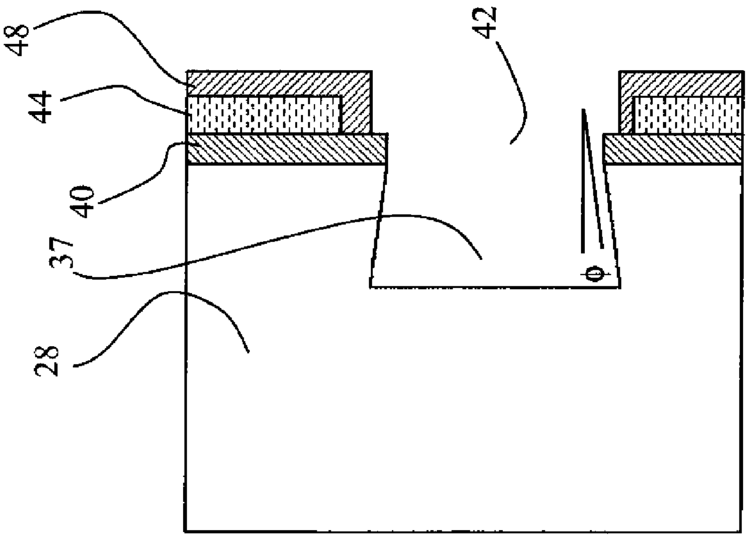

As described in step 70 of FIG. 12, FIG. **7*a* shows a partial section of a liquid ejection printhead die 18 after an anisotropic dry silicon etch has been executed to etch blind feed holes 37 in the silicon substrate 28. The insulating dielectric layer has a high selectivity to the dry silicon etch so that the blind feed holes are self aligned to the feed openings 42. This is highly preferable, since the edge of the feed opening is 0-5 μm away from the chamber walls and resistive heater edge. There is no etch stop and etching is timed to provide a blind feed hole depth in the range 50-300 μm deep. The aspect ratio of the blind feed hole in an exemplary embodiment will be less than 5:1. Since there is no etch stop and the aspect ratio is low a high etch rate>20 μm/min. and, therefore, a short etch time can be achieved on commercially available equipment. Such equipment is available from etching equipment manufacture companies such as AVIZA or Surface Technology Systems. FIG. 7*b* shows section B-B outlined in FIG. 6*b* after the blind feed hole etch. Commercially available systems with high etch rates use a process that etches the blind feed hole in a manner that gives a retrograde profile with retrograde angle $\phi$ that is greater than 1°, and preferably greater than 4°. This retrograde profile (wider toward the back of the substrate 28 and narrower near the front or top surface of the substrate 28) is advantageous in that it lowers the impedance for ink flow or other liquids. It also helps in keeping air bubbles from the liquid ejector. For some embodiments, a preferred range for retrograde angle $\phi$ is between 1° and 10°. The photoresist layer 48** is then stripped using a liquid solvent.

Figure 8:
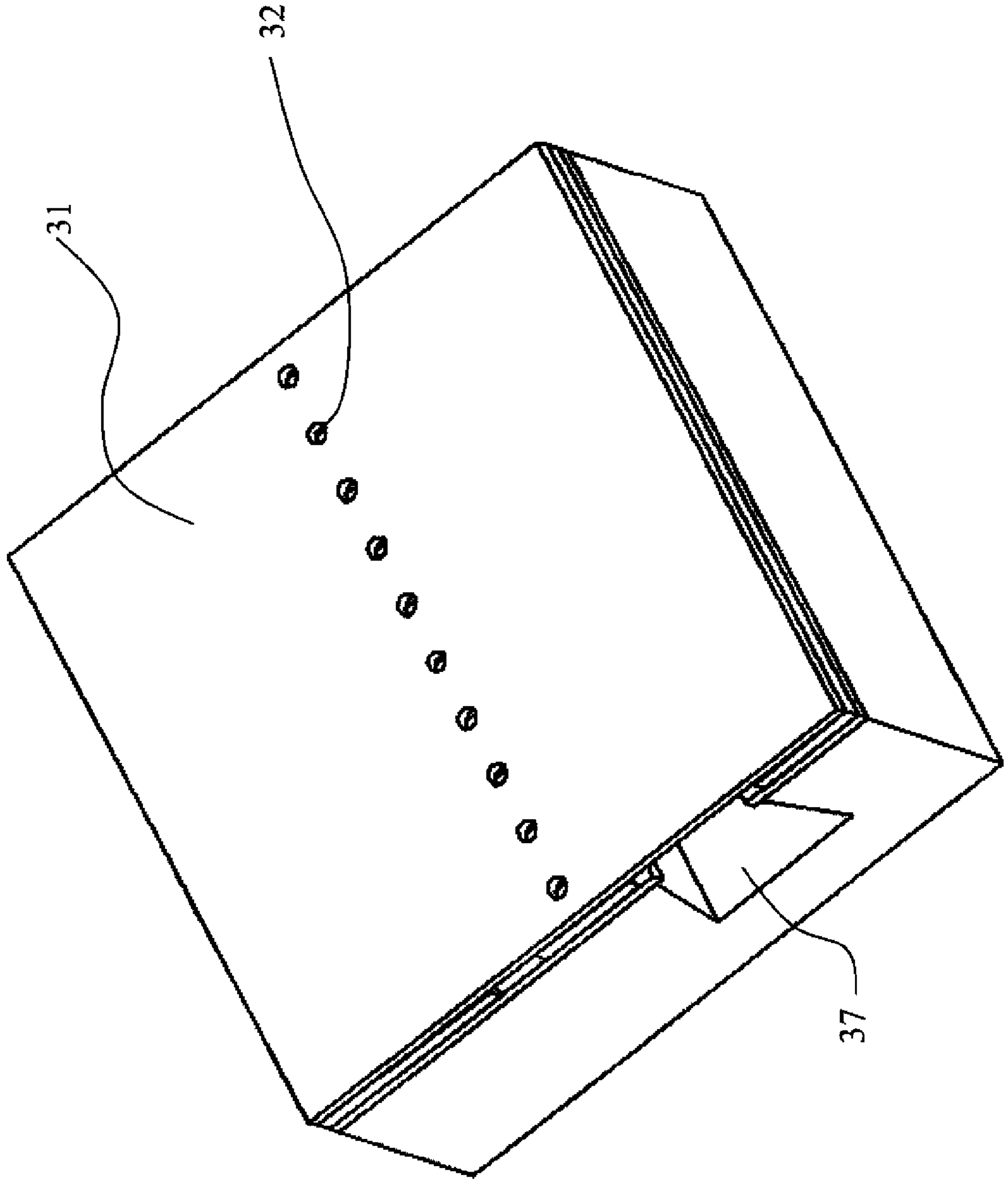

As described in step 72 of FIG. 12, FIG. 8 shows a partial section of a liquid ejection printhead die 18 after a photoimageable nozzle plate layer 31 has been laminated, and patterned to form nozzles 32. The photoimageable nozzle plate layer 31 can be formed using a dry film photoimageable epoxy such as a novolak resin based epoxy, for example: TMMF dry film resist available from Tokyo Ohka Kogyo. The thickness of the photoimageable nozzle plate layer 31 is in the range 5-15 μm and in a preferred embodiment is 10 μm. The use of a dry film laminate for the nozzle plate enables the formation of the nozzle plate 31 on the liquid ejection printhead containing high topography features such as the ink feed holes 36. Also since the ink feed openings are not all the way through the substrate, but are still blind holes 37 at this point, there are no difficulties in applying vacuum to hold down the substrate during lamination.

As described in step 74 of FIG. 12, the substrate 28 containing liquid ejection printhead die 18 is then mounted on a tape frame and ground from the back. FIGS. **9*a* and 9*b* show section B-B as outlined in FIG. 6***b,* before grinding in FIG. 9*a* and after grinding in FIG. 9*b.* The substrate is ground to within a distance t of 0-40 μm of the feed openings. In a preferred embodiment the distance t is 20 μm for the following reasons. Firstly the grinding process can leave residue in the feed openings if the grinding process is used to fully open the feed lines. Secondly, the grinding process typically results in microcracks causing damage for a thickness of 10-20 μm deep into the substrate. This damage will cause a weakness of the substrate resulting in cracking if not removed. Thirdly, the feed opening etch depth varies across the substrate as well as thickness variation of the substrate after the grinding process. The combination of the variation of the feed opening etch depth and the variation of the substrate thickness is typically about 12 μm.

Figure 9A:
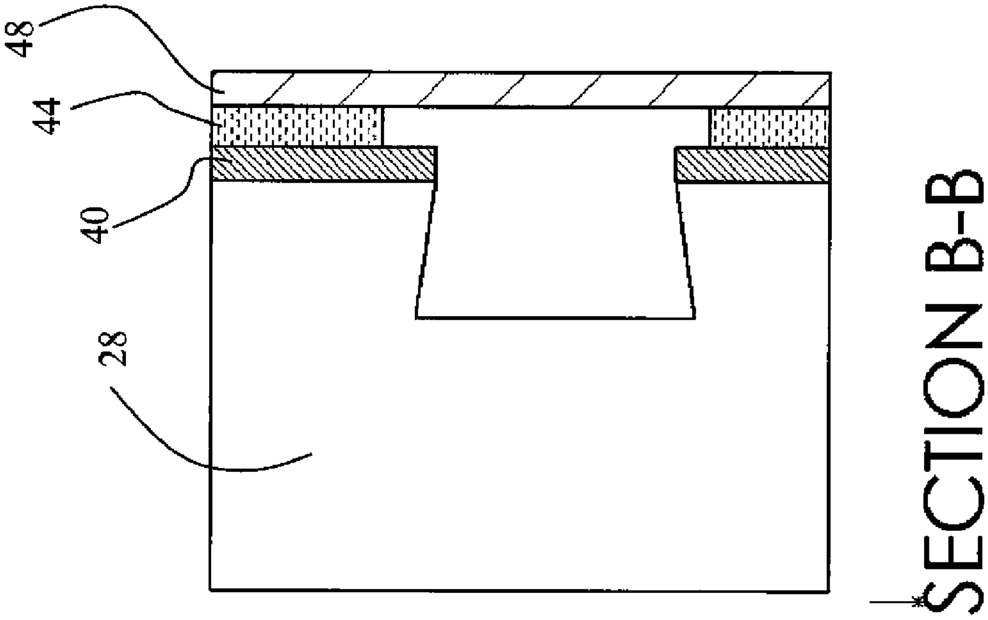
Figure 9B:
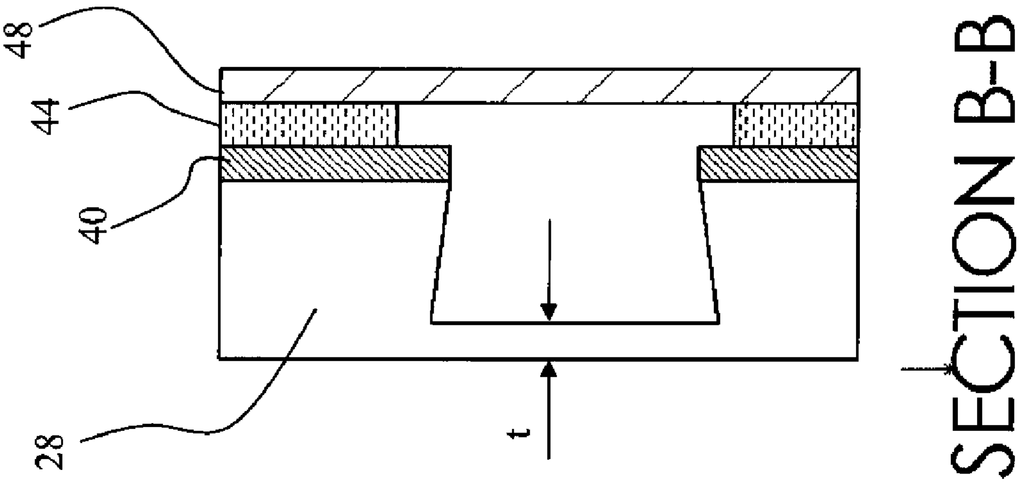
Figure 9C:
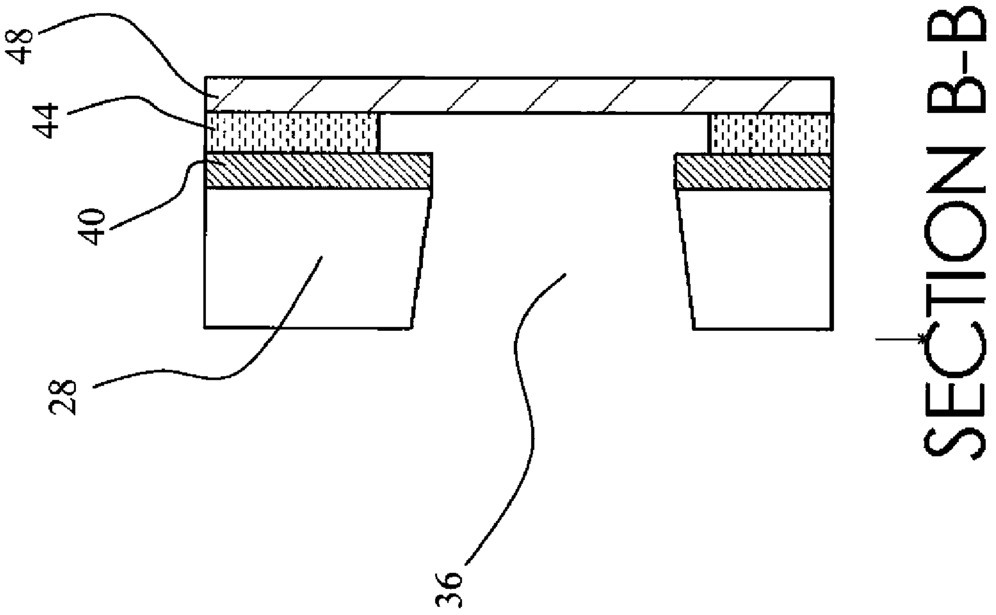

As described in step 76 of FIG. 12, the substrate is then left on the tape frame and exposed, unmasked, to a plasma containing etchant gas Sulfur hexafluoride. Such blanket etch systems are commercially available from, for example, TEPLA and are used to remove damage in the silicon substrate after grinding. The system is maintained so that the substrate temperature stays below 70° C. This ensures that the tape frame will not be affected and the chamber 44 and nozzle plate 31 polymer layers will not be etched. This system performs a blanket etch on the substrate 28, removing silicon from the substrate 28 until the feed openings are exposed. FIG. 9*c* shows section B-B as outlined in FIG. 6*b* with opened feed openings. The advantages of this method are as follows: First, the etch provides clean opening of the feed openings with no residue. Second, damage that was formed during wafer grinding is removed by this step, as is well known in the art. Third, the substrate is mounted on a tape frame so handling of a thin wafer is much easier. Fourth, no patterning of the substrate back is necessary making the process much simpler. The substrate can be taken from this step straight to dicing so that handling of thin wafers is minimized. The final thickness of the silicon substrate 28 is less than or equal to the depth of the feed hole 36 and in a preferred embodiment is in the range 50-300 μm.

WORKING EXAMPLE

Devices were fabricated according to the present invention. Starting with a silicon substrate, an insulating dielectric layer consisting of 1 μm silicon oxide was deposited using plasma enhanced chemical vapor deposition. A resistive heater layer 600 Å thick consisting of a tantalum silicon nitride alloy was deposited using physical vapor deposition and patterned to form an array of heaters. A 0.6 μm aluminum layer was next deposited using physical vapor deposition and patterned to form connections to the resistive heater layer. Next a 0.25 μm silicon nitride layer was deposited using plasma enhanced chemical vapor deposition and a 0.25 μm tantalum layer was deposited using physical vapor deposition. These layers are used to protect the resistive heater material from the ink.

A 1.7 μm resist layer was then coated and patterned and a dry etch was used to form feed openings etched through the silicon oxide and silicon nitride layer. TMMR photoimageable permanent resist was spin coated to a thickness of 12 μm and patterned using a mask with UV light to form the chamber layer. The TMMR resist was then cured at 200° C. for 1 hour.

SPR220-7 photoresist was then spin coated to a thickness of 10 μm on top of the chamber layer giving a thickness of ~22 μm over the feed opening. The resist was then exposed, leaving a 0.25 μm gap between feed opening and resist edge. The exposed silicon in the feed opening was then etched to a depth of 230 μm using DRIE silicon etching system manufactured by Surface Technology Systems. The resist was then stripped in a solvent ALEG-310 manufactured by Baker chemicals.

TMMF photoimageable permanent dry film resist with a thickness of 10 μm was laminated onto the chamber layer using a dry film laminator manufactured by Teikoku Taping Company. The dry film resist was exposed using a mask with UV light and developed to form nozzles.

Protective tape was then applied to the front side of the wafer and the wafer was ground from the backside to a thickness of 250 μm. The wafer was then put into an inductively, coupled plasma etch system manufactured by Oxford Instruments Ltd. and blanket etched using a $SF_6$/Ar gas chemistry until the feed holes were opened in the back of the wafer.

The wafer was then diced by sawing and single liquid ejection printheads were packaged into ink jet printheads. The packaging yield was very high demonstrating the robustness of the dual feed structure. The printhead was filled with ink and drop ejection was measured. The liquid ejection printhead ejected 2.5 pL drops at frequencies>60 kHz.

Another embodiment of the present invention includes the dicing of the wafer from the backside. Typically in the dicing process the wafer needs to be mounted front side up so alignment of the dicing can be performed. It would be preferable for the present invention to dice the wafer from the backside since at the final step that is how the wafer is mounted. However dicing marks need to be provided to align the dicing streets to the chips.

Figure 7A:
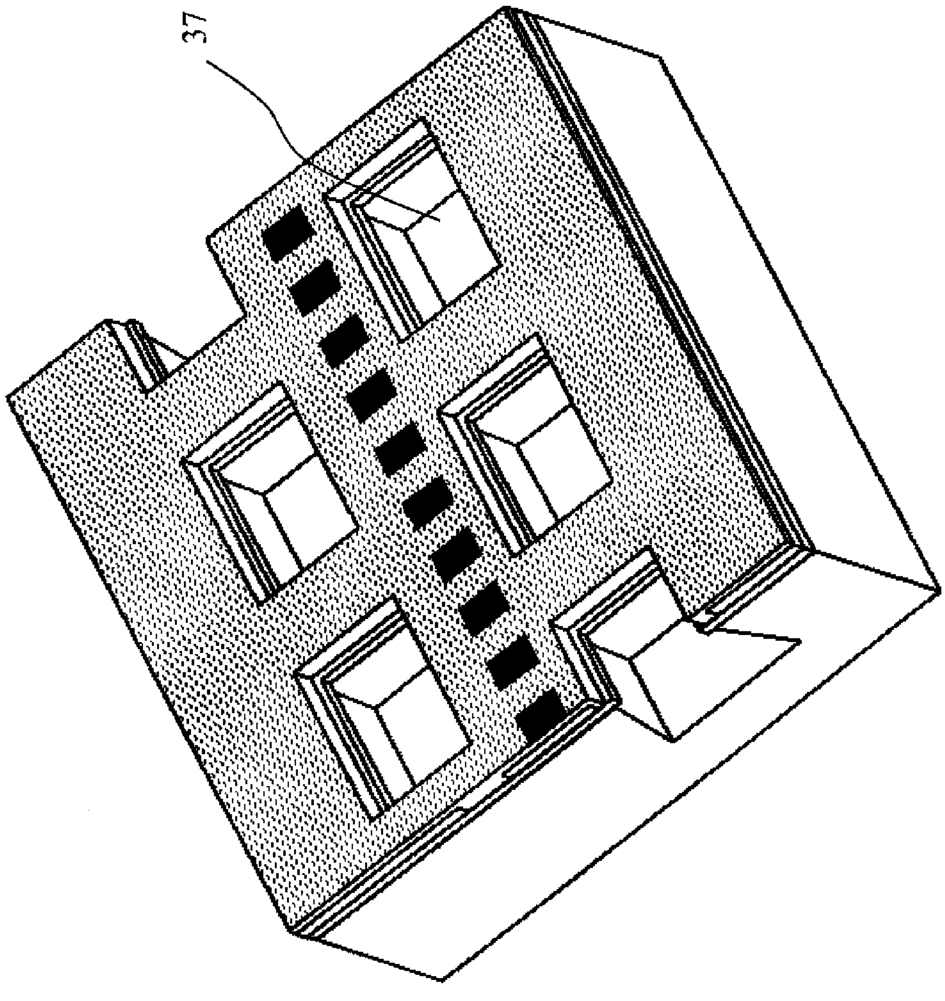
Figure 10:
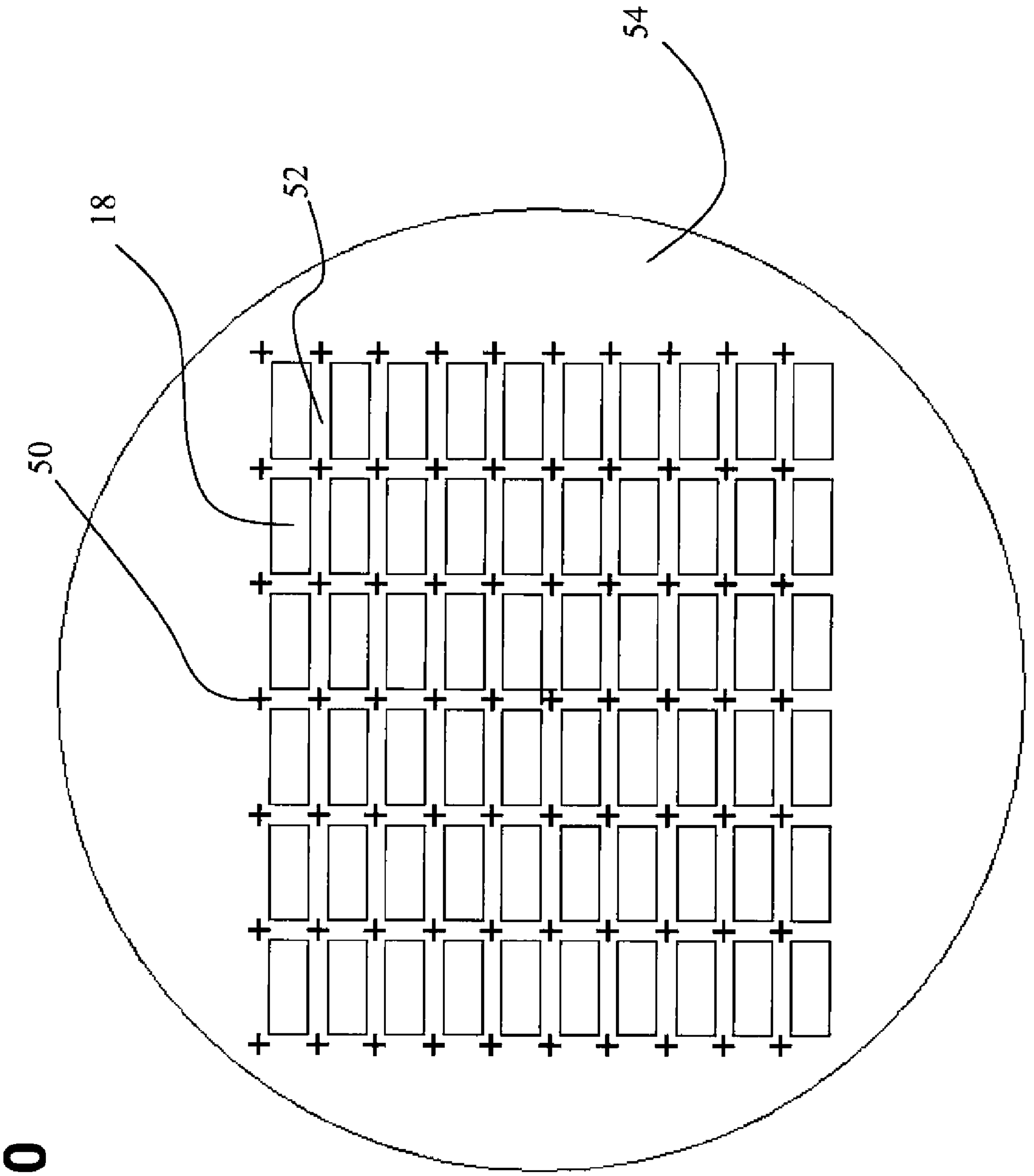
FIG. 10 is a schematic top view of a wafer on which liquid ejection printheads are fabricated with dicing marks according to the present invention.

FIG. 10 shows a schematic view of the top of a silicon wafer 54 containing many liquid ejection printhead die 18 after the feed hole 36 etch described in FIG. 7. Shown on the wafer are the streets 52 where dicing is to occur. During the formation of the feed openings 42 and feed holes 36 dicing marks 50 patterned at the intersections of the streets are also formed. The opening of these dicing marks 50 are designed so that they will be etched to the same depth as the feed holes 36. When the feed holes 36 are exposed during the blanket plasma etch as shown in FIG. 9*c,* these dicing marks 50 will also be exposed. These dicing marks 50 can then be used during dicing to align the dicing saw to the streets.

Figure 11:
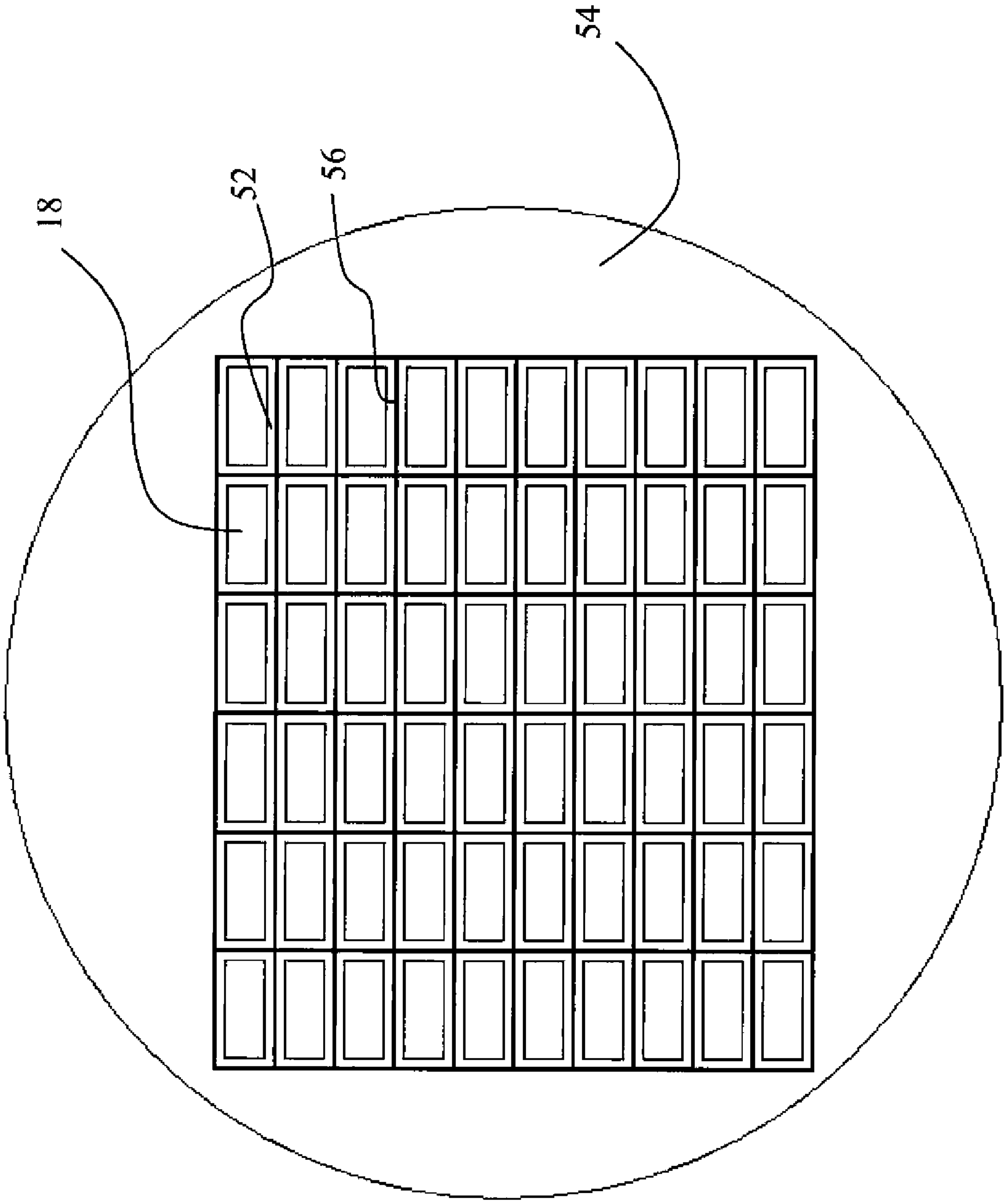
FIG. 11 is a schematic top view of a wafer on which liquid ejection printheads are fabricated with trenches formed in the streets according to the present invention.

In another embodiment of the present invention, liquid ejection printhead die 18 are separated into individual chips (sometimes termed as "singulated" by industry artisans) or, in other words, diced from the wafer without the need for sawing. FIG. 11 shows a schematic view of the top of a silicon wafer 54 containing many liquid ejection printhead die 18, after the feed hole 36 etch described in FIG. 7. Shown on the wafer are the streets 52 where dicing is to occur. During the formation of the feed openings 42 and feed holes 36 trenches 56 patterned along the streets 52 are also to be formed. The open area of these trenches 56 are designed so that they will be etched to the same depth as the feed holes 36. When the feed holes 36 are opened during the blanket plasma etch as shown in FIG. 9*c,* these trenches 56 will also be opened. At this point each liquid ejection printhead die 18 is separated without the need for sawing. The liquid ejection printhead die 18, can then be picked off the dicing tape directly for packaging into a liquid ejection printhead.

The invention has been described in detail with particular reference to certain preferred embodiments thereof, but it will be understood that variations and modifications can be effected within the spirit and scope of the invention.

Parts List

10 liquid ejection system
12 data source
14 controller

16 electrical pulse source
18 liquid ejection printhead die
20 liquid ejector
22 ink drop
24 recording medium
26 wall
28 substrate
30 chamber
31 nozzle plate
32 nozzle orifice
34 resistive heater
36 feed holes
37 blind feed holes
40 insulating dielectric layer
42 feed openings
44 chamber layer
46 outer passivation layer
48 photoresist layer
50 dicing marks
52 streets
54 silicon wafer
56 trenches

What is claimed is:

1. A method for forming a self-aligned hole through a substrate to form a fluid feed passage, the method comprising the steps of forming an insulating layer on a first side of a substrate having two opposing sides;

forming a feature on the insulating layer on the substrate;

etching an opening through the insulating layer on the substrate, such that the opening is physically aligned with the feature on the insulating layer;

coating the feature with a layer of protective material;

patterning the layer of protective material to expose the opening through the insulating layer;

dry etching from the first side of the substrate to form a blind feed hole in the substrate corresponding to a location of the opening through the insulating layer, the blind feed hole including a bottom;

grinding a second side of the substrate to within a distance of 50 microns from the bottom of the blind feed hole; and blanket etching the second side of the substrate to open the bottom of the blind feed hole to form an opening through the entire substrate.

2. The method according to claim 1, wherein the dry etching step forms the blind feed hole with a retrograde profile angle so that the opening proximate to the first side of the substrate is narrower than the opening at the bottom of the blind feed hole.

3. The method according to claim 2, wherein the retrograde profile angle is greater than one degree and less than ten degrees.

4. A method for forming a plurality of liquid ejection devices, the method comprising the steps of:

forming an insulating layer on a first side of a silicon wafer having two opposing sides;

forming an array of drop forming mechanisms on the insulating layer on the silicon wafer;

etching a plurality of openings through the insulating layer on the silicon wafer;

forming a chamber layer on the insulating layer on the silicon wafer, the chamber layer including walls between each drop forming mechanism;

coating the chamber layer with a layer of photoresist;

patterning the layer of photoresist to expose the openings through the insulating layer;

dry etching from the first side of the silicon wafer to form blind holes in the silicon wafer corresponding to the locations of the openings in the insulating layer, the blind holes including bottoms;

forming a nozzle layer on the chamber layer;

patterning the nozzle layer to provide an array of nozzles corresponding to the array of drop forming mechanisms;

grinding a second side of the silicon wafer to within a distance of 50 microns from the bottoms of the blind holes; and blanket etching the second side of the silicon wafer to open the blind holes to form a plurality of holes through the entire silicon wafer.

5. The method according to claim 4, wherein the blind feed hole-forming step further comprises dry etching singulating trenches between adjacent devices, and wherein the blanket etching step opens up the singulating trenches, thereby providing a plurality of singulated devices.

6. The method according to claim 4, wherein the blind feed hole-forming step further comprises using a timed etching process to produce a blind hole depth of 50 microns to 300 microns.

7. The method according to claim 4, wherein the plurality of holes formed through the entire silicon wafer having a width of 50-60 microns.

8. The method according to claim 4, wherein the plurality of holes formed through the entire silicon wafer having a width of 10-100 microns.

9. The method according to claim 1 further comprising the step of:

dicing the second side of the substrate to provide a plurality of singulated devices.

10. The method according to claim 9, wherein the dry-etching step further comprises dry etching alignment marks for said dicing, and wherein the blanket etching step exposes the alignment marks for said dicing.

11. The method according to claim 4, wherein the blind feed hole-forming step provides blind holes with a retrograde profile angle so that the opening proximate to the first side of the silicon wafer is narrower than the opening at the bottom of the blind hole.

12. The method according to claim 11, wherein the retrograde profile angle is greater than one degree.

13. The method according to claim 4, wherein the step of patterning the layer of photoresist further comprises:

patterning the layer of photoresist such that an edge of the photoresist layer is offset from an edge of the insulating layer.

14. The method according to claim 13, wherein the offset of the edge of the photoresist layer is 0-2 microns.

15. The method according to claim 4 further comprising the step of:

dicing the second side of the silicon wafer to provide a plurality of singulated devices.

16. The method according to claim 15, wherein the blind feed hole forming step further comprises dry etching alignment marks for the step of dicing, and wherein the blanket etching step exposes the alignment marks.

17. A method for forming a self-aligned hole through a substrate to form a fluid feed passage, the method comprising the steps of:

forming an insulating layer on a first side of the substrate;

forming a feature on the insulating layer;

etching an opening through the insulating layer, such that the opening is physically aligned with the feature;

coating the feature with a layer of protective material;

patterning the layer of protective material to expose the opening through the insulating layer;

dry etching from the first side of the substrate to form a blind feed hole in the substrate corresponding to a location of the opening through the insulating layer, the blind feed hole including a bottom;

grinding a second side of the substrate to within a distance of 50 microns from the bottom of the blind feed hole; and blanket etching the second side of the substrate to form an opening at the bottom of the blind feed hole, thereby forming an opening through the entire substrate, wherein the dry etching step forms the blind feed hole with a retrograde profile angle so that the opening proximate the first side of the substrate is narrower than the opening at the bottom of the blind feed hole, and wherein the retrograde profile angle is greater than one degree and less than ten degrees.

* * * * *